United States Patent [19]

Beyer

[11] 4,256,388
[45] Mar. 17, 1981

[54] BEARING SCREW AND ITS USE AS A HINGE-PIN IN SPECTACLES
[75] Inventor: Karl Beyer, Geneva, Switzerland
[73] Assignee: La Nationale S.A., Geneva, Switzerland
[21] Appl. No.: 900,765
[22] Filed: Apr. 27, 1978
[30] Foreign Application Priority Data
May 5, 1977 [CH] Switzerland ............... 5619/77
[51] Int. Cl.³ ............................................. G02C 5/22
[52] U.S. Cl. ............................. 351/158; 16/128 A; 308/237 R
[58] Field of Search ............... 351/153, 109, 136, 146, 351/147, 148, 41, 111, 113, 123, 141, 121, 158; D8/387, 85; 292/2; 10/3, 10 P, 87, 11 R; 85/10, DIG. 2, 13, 63–67; 2/14; 16/128 A, 136; 308/237 A, 237 R

[56] References Cited
U.S. PATENT DOCUMENTS

| 1,424,331 | 8/1922 | Adkins | 308/120 R |
| 2,412,120 | 12/1946 | Bouchard | 351/141 |
| 2,828,668 | 4/1958 | De Angeles | 351/109 |

FOREIGN PATENT DOCUMENTS 602477  7/1960 Canada ................. 351/153
1224058 9/1966 Fed. Rep. of Germany ........... 351/153

Primary Examiner—John K. Corbin
Assistant Examiner—B. W. de los Reyes
Attorney, Agent, or Firm—Emory L. Groff, Jr.

[57] ABSTRACT

The invention relates to a bearing screw including a cylindrical shank and a screw threaded end portion in which at least part of the shank has a diameter which is less than the over-all diameter of the threaded end portion and this part of the shank is provided with a sleeve of synthetic resin. The part of the shank which carries the sleeve preferably has a diameter which is substantially equal to the root diameter of the threaded end portion while the maximum diameter of the sleeve is preferably substantially equal to the over-all diameter of the threaded end portion. The invention also relates to a spectacle frame hinge in which a bearing screw having a sleeve of synthetic resin arranged on its shank is used as a hinge pin. In such arrangement the threaded end portion of the screw is screwed into a threaded hole formed in an outer ear of the interfitting ears of the hinge knuckles while the shank of the screw with the sleeve thereon passes through plain holes in the other ears. Preferably the maximum diameter of the sleeve is substantially equal to the diameter of these plain holes.

10 Claims, 3 Drawing Figures

BEARING SCREW AND ITS USE AS A HINGE-PIN IN SPECTACLES

This invention relates to a bearing screw, that is to say a screw comprising a cylindrical shank having a screw-threaded end portion, the shank forming a bearing for a first part which is movable relative to a second part into which the threaded end portion is secured.

This invention also relates to a hinge for a spectacle frame in which such a bearing screw is used as a hinge-pin.

It is well-known that the hinges of spectacle frames constitute an important part and the most sensitive point in such frames. Particular care is therefore used in the manufacture of this element, and manufacturers and users require that the arms of the spectacles pivot without play and in a smooth manner under limited friction.

To achieve this object it has been proposed (West German Patent Application No. 23 56 818) to provide elements, made of synthetic resin, between the two knuckles of the hinge, or to fit a sleeve between the knuckles and the screw (U.S. Pat. No. 2,828,668 or West German Patent Specification DAS NO. 2,003,450), to enable the desired pivoting movement under slight friction to be achieved. However, the known constructions require special hinges in the sense that the holes normally provided for receiving the bearing screw have to be of greater diameter or of special shape for enabling elements made of synthetic resin to be fitted therein. Furthermore the fitting of these elements calls for additional operations during assembly. Finally, in the event of a bearing screw being lost, the synthetic resin elements are generally also lost at the same time, and the hinge can no longer be conveniently repaired simply by replacing the lost screw by a screw of the kind normally available in the specialist trades.

The object of the invention is to eliminate these disadvantages. In one aspect the invention consists in a screw in which the bearing is formed by a sleeve of synthetic resin fitted on a cylindrical portion of the shank of the screw, the diameter of this portion being less than the over-all diameter of the screw-threaded portion.

In another aspect the invention consists in a hinge for a spectacle frame in which the hinge pin for the interfitting ears of the two knuckles of the hinge is constituted by a bearing pin as above described. In such hinge it is convenient if the diameter of the shank portion of the screw is substantially equal to the root diameter of the threaded ear portion, that is the diameter as measured between the bottom of the threads, whilst the maximum diameter of the sleeve is substantially equal to the diameter of the plain holes in the ears through which the shank passes.

Some embodiments of the invention are illustrated diagrammatically, and by way of example only, in the accompanying drawing in which.

Figure 1:
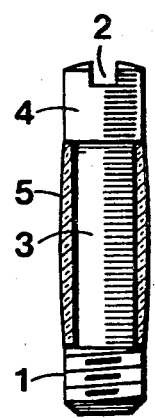
FIG. 1 shows, partly in section, a bearing screw according to the invention.

The screw illustrated in FIG. 1 comprises a metallic shank having a screw-threaded end portion 1 and a slot 2 at its other end. Between the screw-threaded portion 1 and its other end, the shank has two cylindrical portions 3 and 4 of differing diameters the diameter of the shank portion 3 being less than the over-all diameter of the screw-threaded portion 1. In the form illustrated, the diameter of the shank portion 3 is substantially equal to the root diameter of the screw-threaded portion 1, that is to say the diameter as measured between the bottom of the screw-threads.

The shank portion 3 is covered by a sleeve 5 of synthetic resin, the maximum diameter of this sleeve being substantially equal to the over-all diameter of the screw-threaded portion. Furthermore, the outer surface of the sleeve 5 is tapered towards each end of the sleeve.

The sleeve 5 is made of a relatively strong synthetic resin, for example a resin known under the Trade name NYLON or DELRIN. The sleeve 5 may be made by being injection-moulded on to the screw in a suitable mould.

Figure 2:
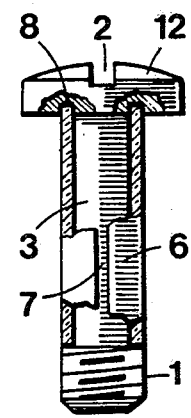
FIG. 2 shows an alternative form of such bearing screw.

In the alternative form shown in FIG. 2, the screw has a screw-threaded portion 1, a head 12 and a cylindrical shank portion 3 which carries a cylindrical sleeve 6. However in this case the sleeve 6 has a slot 7 which extends from one end of the sleeve to the other and parallel to its axis. This slot 7 enables the sleeve to be deformed so that it can be passed over the screw-threaded portion 1 and positioned on the cylindrical shank portion 3. The sleeve then grips the portion 3 as a result of its inherent elasticity. It will be noted that the head 12 has an annular channel 8 into which the upper end of the sleeve 6 is fitted; this contributes to retaining it in the correct position on the shank of the screw.

Figure 3:
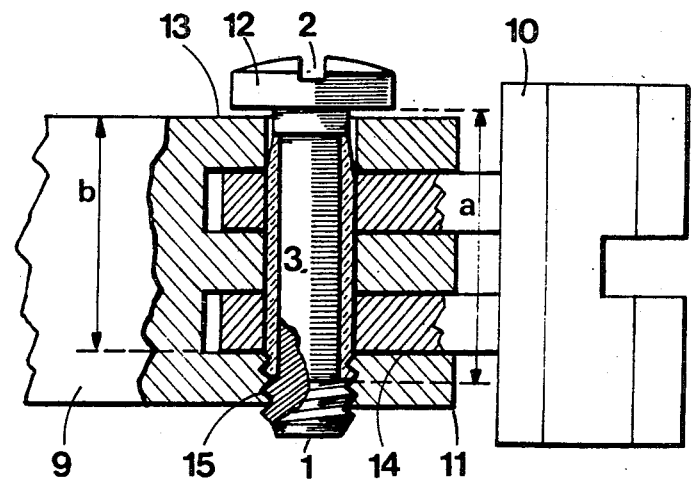
FIG. 3 shows a spectacle frame hinge according to the invention.

FIG. 3 illustrates a spectacle frame hinge which uses as a hinge pin a screw of the kind illustrated in FIG. 1 but having a head 12. The hinge comprises a knuckle 9 having three ears and a knuckle 10 having two ears which are fitted between the ears of the knuckle 9. The outer ear 11 of the knuckle 9 has a screw-threaded hole 15 into which is screwed the threaded end 1 of the screw.

In this construction, the distance a as measured between the inner face of the head 12 of the screw and the nearest part of its threaded end portion 1 is greater than the distance b as measured between the outer face 13 of the ear of the knuckle 9 which lies nearest the head 12 and the inner face 14 of the ear 11 which has the threaded hole 15. Consequently, when the screw is tightened in the hinge, the end of the sleeve 5 is engaged in the threaded hole 15. The screw-thread of the hole 15 thus impresses a groove in the end of the sleeve 5 by causing plastic and/or elastic deformation of the material of the sleeve. At the same time, this tightening action causes axial compression of the sleeve 5 so that the latter bulges and is firmly applied against the walls of the plain holes in the other ears of the knuckles 9 and 10. This deformation thus results in two simultaneous but different actions, namely:

1. a locking of the screw in the threaded hole 15, which obviates the need for expanding the end of the screw by a punching operation in order to prevent it from working loose, and
2. suppression of play between the two elements of the hinge by radial expansion of the sleeve and even by possible flow of the synthetic resin so that it penetrates part-way between the interfaces of the ears of the knuckles 9 and 10.

FIG. 3 clearly shows that the elements of the hinge are of the same shape as those designed to be fitted together by means of a conventional bearing screw, the diameter of the bearing portion of which would correspond to that of the sleeve 5.

It will be appreciated that the gentle friction between the knuckles 9 and 10 results from radial expansion of the sleeve 5 that is caused by the axial compression which the sleeve undergoes between the threaded hole 15 and the shoulder resulting from the difference between the diameters of the shank portions 3 and 4. Consequently, tensile loading of the screw is very low compared with that occurring in conventional constructions in which friction between the knuckles is achieved by elastic deformation of the ears of the knuckles under the tightening action of the screw.

It will be obvious that numerous modifications are possible and that the outer surface of the sleeve may be perfectly cylindrical or may be slightly tapered at one or even both of its ends.

Gentle friction could also be achieved without the need for applying axail compression to the sleeve by means of the screw; this would be possible by making the outside diameter of the sleeve very slightly greater than the diameter of the plain holes in the ears of the knuckles.

Retention of the sleeve 5 by the shoulder formed between the shank portions 3 and 4, or by the head 12 is very advantageous, but the connection between the sleeve and the screw could of course be established by other means, for example by forming one or more grooves or annular ribs in or on the cylindrical shank portion 3. As an alternative, the shank portion 3 could be scored.

The sleeve 5 could also be made of a heat-shrinkable synthetic resin and with an initial inside diameter which is greater than the over-all diameter of the screw-threaded portion 1, the sleeve being shrunk on to the shank portion 3 by the application of heat.

I claim:

1. A bearing screw having a cylindrical shank and an end portion having a screw thread thereon wherein said shank has a diameter which is substantially equal to the inner diameter of the thread, a sleeve of synthetic resin in abutment with said thread and tightly fitting said shank in the lesser diameter portion thereof, the maximum diameter of the sleeve being substantially equal to the over-all diameter of the threaded end portion.

2. A bearing screw according to claim 1, wherein the sleeve is tapered at least at that end adjacent the threaded end portion.

3. A bearing screw according to claim 1, wherein the sleeve has a slot which passes through its wall and extends from one end to the other end.

4. A bearing screw according to claim 1 wherein the sleeve is located at one end by a shoulder formed on the shank and at the other end by the threaded end portion.

5. A bearing screw according to claim 1 wherein the sleeve is moulded onto the said part of the shank.

6. A bearing screw according to claim 1 wherein the sleeve is shrunk onto the said part of the shank.

7. A spectacle frame hinge comprising two knuckles having mutually interfitting ears, a bearing screw constituting a hinge pin, an end portion of said pin having a screw thread thereon screwed into a threaded hole in an outermost ear and a cylindrical shank portion passing through plain holes in the remaining ears wherein the shank portion has a diameter which is equal to the inner diameter of the thread and less than the diameter of said holes, a sleeve of synthetic resin in abutment with said thread and tightly fitting said shank in the lesser diameter portion thereof, the maximum diameter of the sleeve being substantially equal to the diameter of said plain holes and to the overall diameter of the threaded end portion.

8. A spectacle frame hinge according to claim 7 wherein the diameter of the shank portion is substantially equal to the root diameter of the threaded end portion.

9. A spectacle frame hinge according to claim 7 wherein the sleeve is tapered at least at that end adjacent the threaded portion of the screw.

10. A spectacle frame hinge according to claim 7 wherein, the screw has a head and wherein the distance measured between the inner face of the head and the nearest part of the threaded end portion is greater than the distance measured between the outer face of that ear which lies nearest to the head and the inner face of that ear which has the threaded hole, said synthetic resin sleeve being partially screwed in said threaded hole.

* * * * *